United States Patent Office 3,074,946
Patented Jan. 22, 1963

3,074,946
PREPARATION OF 2-ARYLAMINO-4,6-DICHLORO-s-TRIAZINES
Kenneth H. Rattenbury, Kansas City North, Mo., Edward R. Levy, Merriam, Kans., and Ara H. Zakaryan, Parkville, Mo., assignors to Chemagro Corporation, New York, N.Y., a corporation of New York
No Drawing. Filed Dec. 8, 1959, Ser. No. 858,050
6 Claims. (Cl. 260—249.5)

This invention relates to the preparation of 2-arylamino-4,6-dichloro-s-triazines.

As shown in Wolf Patent 2,720,480, 2-arylamino-4,6 dichloro-s-triazines are useful as fungicides. Various procedures have been utilized to prepare these compounds. Thus, in Example XIV of the Wolf patent, 2,4-dichloro-6-(o-bromoanilino)-s-triazine is prepared by reacting cyanuric chloride with o-bromoaniline in the presence of acetone followed by the addition of aqueous sodium hydroxide. This process has the disadvantage that certain acetone insoluble products are obtained which reduce the yield and which also complicate the recovery procedure. Additionally, special means are required to remove the arylamine hydrochloride formed unless it is regenerated by sodium hydroxide, as will be observed from a consideration of Examples I and II of Wolf.

It is an object of the present invention to prepare 2,4-dichloro-6-arylamino-s-triazines and 2,4-dichloro-6-haloarylamino-s-triazines by an improved procedure.

Another object is to eliminate the formation of acetone insolubles in preparing 2,4-dichloro-6-o-chloroanilino-s-triazine from cyanuric chloride and o-chloroaniline.

An additional object is to eliminate the necessity for the neutralization of the hydrochloric acid formed in reacting cyanuric chloride with an arylamine or a haloaryl amine.

Yet another object is to synthesize 2,4-dichloro-6-arylamino-s-triazines and 2,4-dichloro-6-haloarylamino-s-triazines essentially free of hydrolytic products and also free of di and triarylamino compounds.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by reacting 1 mol of cyanuric chloride with approximately 1 mol of an arylamine or haloarylamine under anhydrous conditions utilizing an organic solvent. Preferably the solvent is an aliphatic hydrocarbon although a small amount of an aromatic hydrocarbon can be included. Utilizing toluene as the solvent the yield of 2,4-dichloro-6-o-chloranilino-s-triazine from cyanuric chloride and o-chloroaniline is 70% whereas when aliphatic hydrocarbons are employed as the solvent the yields go up to 94–99%.

The hydrogen chloride formed in the reaction is removed by heating.

Using the formation of 2,4-dichloro-6-o-chloroanilino-s-triazine (commercially available as Dyrene) as an example the reaction proceeds as follows:

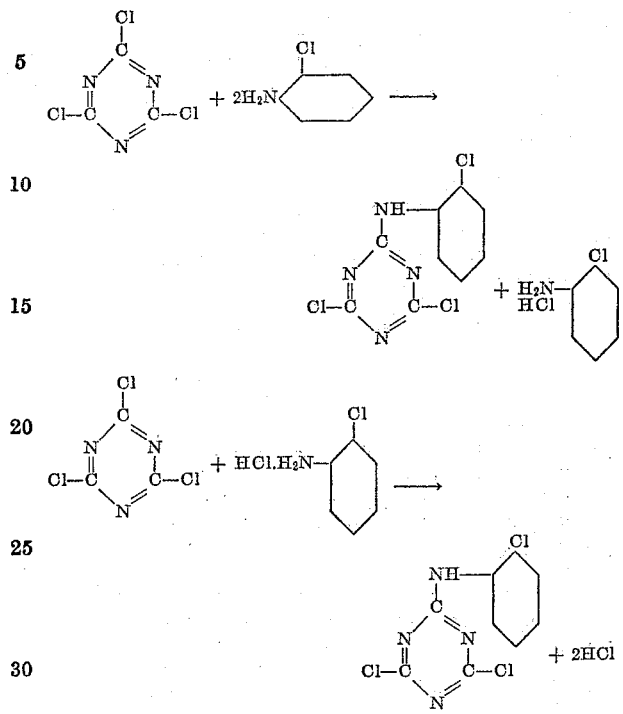

While the net result is that 1 mol of cyanuric chloride plus 1 mol of chloroaniline gives 1 mol of Dyrene plus 1 mol of hydrogen chloride, the reaction proceeds as indicated. By carrying the reaction out at temperatures of 80° C. and below the intermediate o-chloroaniline hydrochloride can actually be isolated. While temperatures as low as 60° C. can be employed, it has been found that for reasonably fast reaction the temperature should be at least 80° C.

The hydrocarbon solvent preferably boils between 90 and 115° C. although the boiling point of the solvent can range from 80–150° C. There can be employed heptane, octane, nonane, decane, naphtha and similar aliphatic hydrocarbons. Among the commercial solvents which have been used successfully are Lactol (an aliphatic hydrocarbon from petroleum which is a colorless liquid, specific gravity 0.728, boiling range 93–111° C.), Apcothinner (a varnish makers' and painters' naphtha which is a colorless liquid, specific gravity 0.763, boiling point range 115–142° C.), Espesol 205 (an aliphatic hydrocarbon mixture which is a colorless liquid, specific gravity of 0.716 and boiling point range of 98–115° C.), and Skelly Solv L (a mixture of hexanes, heptanes, and octanes having a specific gravity of 0.732 and a boiling point range of 88–107° C.).

Solvents boiling in the range of 90–115° C. are preferred since higher boiling materials cause a loss in yield while lower boiling ones increase the reaction period considerably. Reflux temperature or slightly below has been found to be convenient. To insure against disubstitution good agitation should be employed.

As the arylamine or haloarylamine there can be employed aniline, o-chloroaniline, o-bromoaniline, o-iodoaniline, m-chloroaniline, m-bromoaniline, m-iodoaniline, p-chloroaniline, p-bromoaniline, p-iodoaniline, p-phenylaniline, o-phenylaniline, x-naphthylamine, β-naphthylamine, 9-phenanthrylamine, p-toluidine, o-toluidine, m-toluidine, m-dodecylaniline, o-ethylaniline, p-amylaniline, 3-acenaphthylamine, p-vinylaniline, o-propenylaniline, o-vinylaniline, p-methallylaniline, 2-vinyl-α-naphthylamine, 2,5-dichloroaniline, 4-chloronaphthylamine, 2-methyl-5-chloroaniline, 2,6-dichloroaniline, 3,4-dibromoaniline, 1-3,5-trichloroaniline, 2,4-dichloroaniline.

The triazines prepared according to the invention include 2,4-dichloro-6-phenylamine-s-triazine;
2,4-dichloro-6-(o-chloroanilino)-s-triazine;
2,4-dichloro-6-(p-chloroanilino)-s-triazine;
2,4-dichloro-6-(m-chloroanilino)-s-triazine;
2,4-dichloro-6-(o-bromoanilino)-s-triazine;
2,4-dichloro-6-(p-bromoanilino)-s-triazine;
2,4-dichloro-6-(m-bromoanilino)-s-triazine;
2,4-dichloro-6-(o-iodoanilino)-s-triazine;
2,4-dichloro-6-(p-phenylanilino)-s-triazine;
2,4-dichloro-6-(α-naphthylamino)-s-triazine;
2,4-dichloro-6-(β-naphthylamino)-s-triazine;
2,4-dichloro-6-(9-phenanthrylamino)-s-triazine;
2,4-dichloro-6-(p-toluidino)-s-triazine;
2,4-dichloro-6-(m-toluidino)-s-triazine;
2,4-dichloro-6-(m-dodecylanilino)-s-triazine;
2,4-dichloro-6-(o-ethylanilino)-s-triazine;
2,4-dichloro-6-(3-acenaphthylamino)-s-triazine;
2,4-dichloro-6-(p-vinylanilino)-s-triazine;
2,4-dichloro-6-(o-propenylanilino)-s-triazine;
2,4-dichloro-6-(p-methallylanilino)-s-triazine;
2,4-dichloro-6-(2-vinyl-α-naphthylamino)-s-triazine;
2,4-dichloro-6-(2,5-dichloroanilino)-s-triazine;
2,4-dichloro-6-(2-methyl-5-chloroanilino)-s-triazine;
2,4-dichloro-6-(2,6-dichloroanilino)-s-triazine;
2,4-dichloro-6-(3,4-dibromoanilino)-s-triazine;
2,4-dichloro-6-(2,4-dichloroanilino)-s-triazine;
2,4-dichloro-6-(2-chloro-4-bromoanilino)-s-triazine, and
2,4-dichloro-6-(1,3,5-trichloroanilino)-s-triazine.

The preferred starting material is o-chloroaniline.

Unless otherwise indicated all parts and percentages are by weight.

*Example*

Into a 1 liter flask equipped with an agitator, thermometer, a reflux condenser connected to a water trap, through a safety flask and a 125 ml. dropping funnel were added 250 ml. of Lactol (aliphatic hydrocarbon solvent, boiling range 93–111° C.) and 92.2 gms. (0.50 mol.) of cyanuric chloride and the agitation started. The temperature was raised to 80° C. and 64.5 grams of o-chloroaniline (0.505 mol.) was added directly to the slurry over a 90 minute period while the temperature was held at 75–85° C. After all of the o-chloroaniline was added the funnel was washed down with 10 ml. of the Lactol and the washings added to the reaction mixture. The slurry was then heated to reflux (ca. 100° C.) with the safety flask and water trap hooked up. Refluxing was continued until HCl evolution was complete. This took about 3½ hours. Heating was then stopped and the product was allowed to cool to 80° C. when agitation was stopped. The mass was cooled to room temperature and filtered with suction. An additional 50 ml. of fresh Lactol was added to the cake and sucked through. The cake was dried and a yield of 136 grams (99%) of 2,4-dichloro-6-(o-chloroanilino)-s-triazine was obtained having a purity of over 95%.

In other runs using double quantities, the yield of product was 260–272 grams (95–99%) with a purity of 95% or better. The length of time of addition of the o-chloroaniline is not critical and can be varied considerably.

By recycling the solvent slightly higher yields are obtained, although in some cases with sacrifice of purity. In other recycle runs, purity remained close to 100%.

In a run identical with the example but utilizing Apcothinner as the solvent, the yield was 97.4%.

In another run identical with the example but employing Skelly Solv L as the solvent, the yield was 94.5%.

When Espesol 205 was employed as the solvent, the yield was 97.3%.

What is claimed is:

1. A process of preparing a compound selected from the group consisting of 2,4-dichloro-6-arylamino-s-triazines wherein the aryl is selected from the group consisting of phenyl, phenyl substituted by aliphatic hydrocarbon, diphenyl, naphthyl, phenanthryl and acenaphthyl, and the halo is selected from the group consisting of chloro, bromo and iodo and 2,4-dichloro-6-haloarylamino-s-triazines consisting essentially of reacting 1 mol. of cyanuric chloride with 1 mol. of a member of the group consisting of arylamines and haloarylamines under substantially anhydrous conditions at a temperature of 80 to 150° C. in the presence of a saturated aliphatic hydrocarbon solvent and recovering said compound from said anhydrous aliphatic hydrocarbon solvent.

2. A process according to claim 1 wherein the solvent boils at 90–115° C. and the reaction is carried out near the boiling point of the solvent.

3. A process of preparing 2,4-dichloro-6-(o-chloroanilino)-s-triazine consisting essentially of reacting 1 mol. of cyanuric chloride with 1 mol. of o-chloroaniline under substantially anhydrous conditions at 80–150° C. in the presence of a saturated aliphatic hydrocarbon solvent and recovering said compound from said anhydrous aliphatic hydrocarbon solvent.

4. A process according to claim 3 wherein the reaction is carried out at 90–115° C.

5. A process according to claim 4 wherein the solvent boils at approximately the reaction temperature.

6. A process of preparing 2,4-dichloro-6-(o-chloroanilino)-s-triazine consisting essentially of reacting 1 mol. of cyanuric chloride with 1 mol. of o-chloroaniline under substantially anhydrous conditions at a temperature of 90–115° C. in the presence of a saturated aliphatic hydrocarbon solvent, continuing the reaction until evolution of hydrochloric acid ceases, cooling the product to room temperature and filtering to recover the 2,4-dichloro-6-(o-chloroanilino)-s-triazine.

References Cited in the file of this patent

UNITED STATES PATENTS

| | | |
|---|---|---|
| 2,720,480 | Wolf | Oct. 11, 1955 |
| 2,728,767 | Wolf | Dec. 27, 1955 |

FOREIGN PATENTS

| | | |
|---|---|---|
| 183,196 | Switzerland | June 16, 1936 |
| 315,321 | Switzerland | Sept. 29, 1956 |

OTHER REFERENCES

MacArdle: "Use of Solvents," D. Van Nostrand Co., N.Y., 1925, p. 8.

Curd et al.: Journ. of the Chem. Soc., 1947, pages 154 to 160.

Bergmann: "The Chemistry of Acetylene and Related Compounds," Interscience Publishers Inc., N.Y., 1948, p. 80.

Thurston et al.: Journ. of the Am. Chem. Soc., vol. 73, pages 2981 to 2986 (1951).